Aug. 4, 1936.  L. O. E. ROESSEL  2,049,868

RAKE

Filed May 4, 1935  2 Sheets-Sheet 1

L. OTTO E. ROESSEL
INVENTOR

BY John P. Nironow
ATTORNEY

Aug. 4, 1936.                L. O. E. ROESSEL                2,049,868
RAKE
Filed May 4, 1935                2 Sheets-Sheet 2
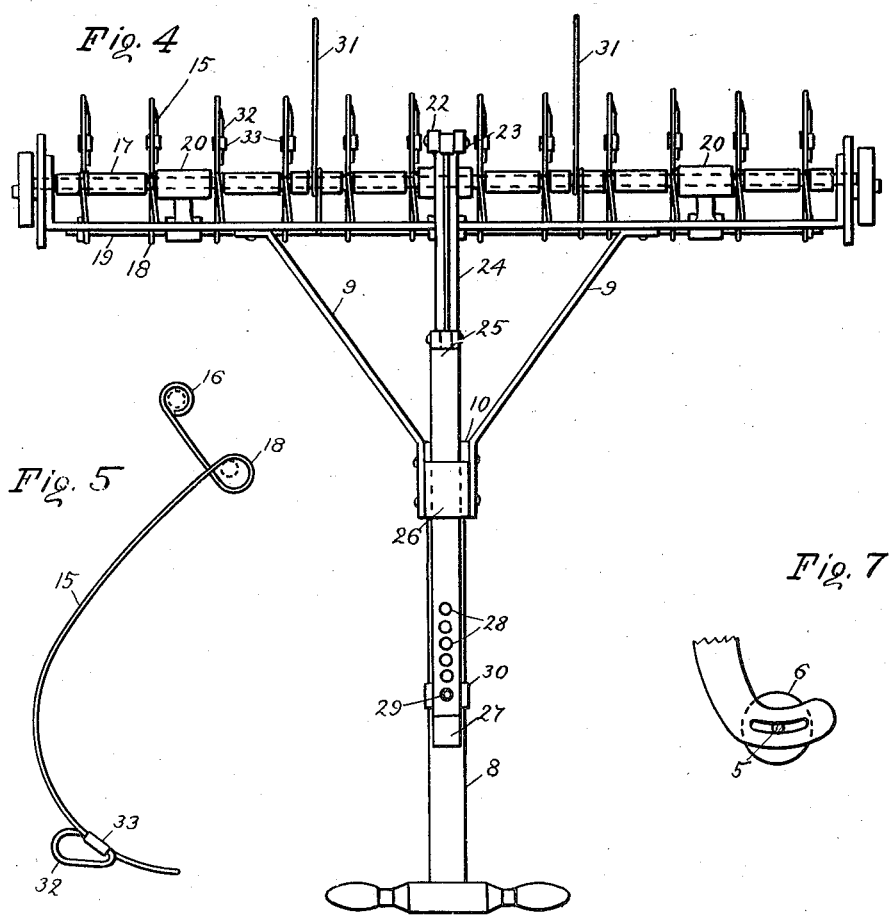
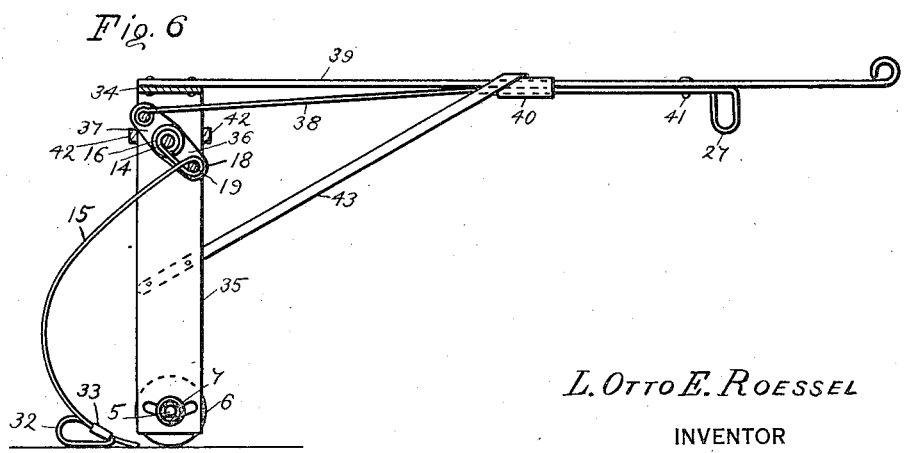
L. Otto E. Roessel
INVENTOR
BY John P. Nilsonov
ATTORNEY Patented Aug. 4, 1936

2,049,868

UNITED STATES PATENT OFFICE 2,049,868

RAKE

Louis Otto E. Roessel, Chappaqua, N. Y.

Application May 4, 1935, Serial No. 19,765

5 Claims. (Cl. 55—10)

My invention relates to rakes and has particular reference to lawn rakes adapted for manual operation and provided with unloading mechanism.

The object of my invention is to provide a rake having resilient curved teeth adapted to pick up and gather various refuse from lawns, such as dead leaves, twigs etc.

Another object of my invention is to provide a rake with manually operated unloading attachment for discharging the gathered refuse in a desired place.

Another object of my invention is to provide a rake supported on wheels in such manner that the points of the teeth are relieved from any pressure due to the weight of the rake.

Another object of my invention is to provide teeth of the rake with heels back of their points adapted to slide over the ground and to keep the points at the desired height above the surface of the ground.

Another object of my invention is to provide means for adjusting the height of the tooth points above the ground.

Another object of my invention is to provide a mechanism for manually turning all the teeth at the same time for discharging the gathered refuse.

Another object of my invention is to provide a locking means for teeth turning mechanism whereby the teeth may be locked in any desired position in relation to the ground and prevented from being moved by the resistance of the refuse on the ground.

My invention is more fully described in the accompanying specification and drawings in which—

Figure 1:
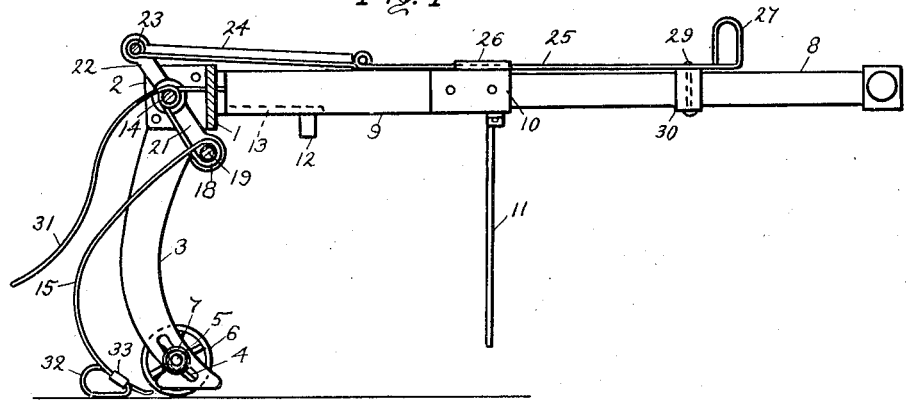
Figure 2:
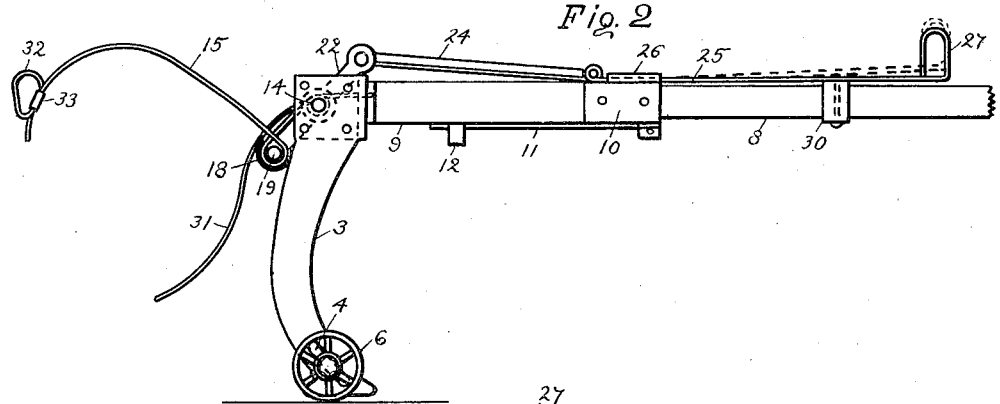
Figure 3:
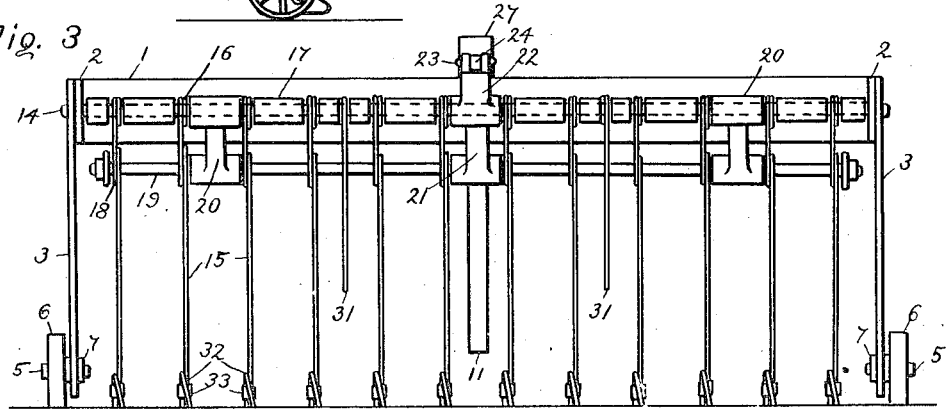

Fig. 1 is an elevation of my rake partly in section, Fig. 2 is an elevation with the teeth raised into inoperative position, Fig. 3 is a rear view of my rake, Fig. 4 is a top plan view, Fig. 5 is a detail view showing one tooth, Fig. 6 is a sectional elevation of a modified construction, and Fig. 7 is a detail view of a modified wheel mounting.

My rake consists of a frame formed of a horizontal bar 1 the ends 2 of which are bent at right angles forming brackets to which legs 3 are attached. The legs have slots 4 in which shafts 5 for wheels 6 are supported, being tightened by nuts 7. The lower ends of the legs are flattened and curved at the edges forming skiis for sliding on the ground in case the wheels become damaged or loosened. The slots 4 are made at an angle as shown so as to permit the adjustment of the wheels not only for the height of support but also for bringing the point of support to the rear or to the front.

A handle bar 8 is attached to the bar 1 by means of bars 9 attached to the bar 1 at one end and to a ferrule or sleeve 10 into which the end of the handle bar 8 is fitted. A third leg or rest 11 is hingedly connected to the ferrule 10 and can be moved out of the way by turning it over until its free end is caught in a resilient clamp 12 supported on a bracket 13 attached to the bar 1.

A shaft 14 is journaled by its ends in the brackets 2 and supports a plurality of teeth 15 made of resilient metal, preferably hardened steel wire. Loops 16 are formed on the ends of the teeth fitting over the shaft 14. Spacing sleeves 17 are placed on the shaft 14 in order to keep the teeth at regular distances apart. Additional loops 18 are formed on the teeth and are loosely fitted over a guiding rod 19.

The shaft 14 and the rod 19 are connected together by brackets 20 and 21. The latter has a lever arm 22 pivotally connected by a pin 23 with a link 24, which in turn is pivotally connected with a sliding bar 25. This bar is guided by a cap 26 on top of the ferrule 10. The other end of the bar 25 has a handle 27 and is provided with a number of holes 28 for a locking pin 29. The latter is fitted in a sleeve 30 fitted over the handle 8. The bar 25 is sufficiently resilient so that it can be raised by its handle as shown in dotted lines in Fig. 2 when it is desired to slide it over the pin. The rotation of the shaft 14 is limited in one position by the brackets 20 and 21 striking the lower edge of the bar 1, and in the other position by the arm 22 striking the upper edge of the bar 1 (as shown in Figs. 1 and 2). Unloading rods 31 are fitted with their loops over the shaft 14, the upper ends of the rods being held in corresponding holes in the bar 1.

A loop 32 is formed at the lower end of each of the teeth 15 and is tied together by a metal clip 33. The loop is flattened at the lower side forming a guiding member or ski for the tooth. This guiding member or heel slides over the ground when the rake is in operation and prevents the point of the tooth from digging itself into the ground.

My rake is especially adapted for gathering dead leaves, twigs and other refuse from lawns in gardens and parks, to be pulled by one man. With the handle 27 pushed all the way in, until the brackets 20 come to rest against the bar 1, the teeth are brought forward so that they rest principally on the guiding loops 32, the points of the teeth being somewhat raised from the ground.

By pulling on the handle 27 the teeth are moved back. By catching the bar 25 on the pin 29 with one of the holes 28, the teeth may be set in any desired position: on the first or second hole, for instance, the teeth may hold the position with their points scraping the ground; on the next holes the teeth may be raised above the ground and placed at a more obtuse angle. In this position the teeth may be again brought into contact with the ground by raising the wheels 6. The teeth are curved as shown, being concave in direction of movement of the rake so as to gather the refuse in the concave space formed by all the teeth in the rake. At certain intervals this refuse is discharged from the rake. For this purpose the handle 27 is pulled until the arm 21 comes to rest against the upper edge of the bar 1. The teeth, being raised by this movement, pass on the other side of the discharge rods 31 which help to release the refuse from the teeth. The discharge or unloading position of the rake is shown in Fig. 2.

The slot 4 may be arranged in a substantially horizontal direction as shown in Fig. 7, in which case the change of the position of the wheels changes the angle of the points of the teeth in relation to the ground. By shifting the wheels forward the angle becomes more obtuse with corresponding development of the scraping action of the teeth. With the wheels in the rear of the slots the tooth points become parallel or almost parallel to the ground and are more adapted for picking up objects rather than scraping the ground. In actual practice the wheels are usually set in accordance with the conditions of the ground before the work is started, and further adjustments are accomplished during the work by moving the sliding rod 25.

A modified arrangement is shown in Fig. 6. Here a bar 34 has its ends 35 bent over at right angles so as to form legs for the wheels 6. The shaft 14 is journaled in these legs under the bar 1 and is connected by brackets 36 with the rod 19 which guides the teeth 15. One of the brackets 36 has an arm 37 pivotally connected with the end of a resilient sliding bar 38. The latter is guided under a metal handle bar 39 in a sleeve 40 and has a handle 27 on the end. The front portion of the bar 38 has holes arranged like the bar 25 for engaging a pin 41 fitted in the handle bar 39. Rods 42 attached to the sides of the legs 35 limit the rotary movement of the lever arm 37. Side braces 43 tend to stiffen the framework of the rake.

Important advantages of my rake are that it is simple and inexpensive for its manufacturing, is well adapted for manual operation in gardens and parks where it is not desired or is impractical to use horses, is adapted for effectively removing dead leaves, cut grass, twigs and other trash from the lawns, it gathers this refuse in the hollow of its teeth and is adapted to discharge it in desired places. It can be easily adjusted for various conditions of operation, various kind of trash and various conditions of the surface of the ground. The teeth, being resilient, yield to harder or heavier objects such as stones without suffering any damage. The points of the teeth are prevented from digging into the ground by special heel or ski loops back of the points.

It is understood, of course, that the constructions described represent only typical embodiments of my invention, and they may be further modified without departing from the spirit of my invention.

I claim as my invention:

1. In a rake having a frame supported on wheels at its ends and a handle bar on said frame, the combination of a shaft supported on said frame, a plurality of curved resilient teeth mounted on said shaft and adapted to reach to the ground with their points, and loops on said teeth back of said points, said loops being adapted to slide on the ground by their lower portions.

2. In a rake having a frame supported on wheels at its ends and a handle bar on said frame, the combination of a shaft supported on said frame, a plurality of curved resilient teeth mounted on said shaft and adapted to reach to the ground with their points, and loops formed at the lower ends of said teeth back of said points, said loops being flattened at their lower portions and adapted to slide over the ground.

3. In a rake having a frame supported on wheels at its ends and a handle bar transversely attached to said frame, the combination of a shaft rotatively supported on said frame, a plurality of teeth on said shaft, a lever attached to said shaft, a bar pivotally connected to said lever, a flexible extension on said bar slidably supported on said handle, said extension being adapted to be manually moved for turning said teeth with said shaft into various operative and inoperative positions, and locking means for preventing said extension from moving on said handle, said extension being adapted to be resiliently manually raised from said bar thereby releasing said locking means.

4. In a rake having a frame supported on wheels at its ends and a handle transversely attached to said frame, the combination of a shaft rotatively supported on said frame, a plurality of teeth on said shaft, a lever attached to said shaft, a bar pivotally connected to said lever, a flexible resilient extension on said bar slidably supported on said handle by its middle portion, the free end of said extension being provided with a plurality of holes, and a pin on said handle adapted to register with one of said holes thereby locking said extension in its position, said extension being adapted to be manually deflected from said handle thereby released from said pin and being further adapted to be moved lengthwise for turning said shaft with said teeth into various operative and inoperative positions.

5. In a rake, the combination of a frame having legs adapted to be moved over the ground, a handle on the frame, a plurality of curved teeth made of a resilient wire and fastened by their upper ends in said frame, and loops formed at the lower ends of said teeth, said loops being adapted to slide over the ground and to support the ends of the teeth above the ground.

LOUIS OTTO E. ROESSEL.